(12) United States Patent
Koroku et al.

(10) Patent No.: US 9,955,418 B2
(45) Date of Patent: Apr. 24, 2018

(54) WIRELESS COMMUNICATION DEVICE, ELECTRONIC WATCH, WIRELESS COMMUNICATION METHOD, NON-TRANSITORY RECORDING MEDIUM, AND WIRELESS COMMUNICATION SYSTEM

(71) Applicant: CASIO COMPUTER CO., LTD., Tokyo (JP)

(72) Inventors: Taisuke Koroku, Sagamihara (JP); Masao Sambongi, Hachioji (JP); Satoru Watanabe, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/008,720

(22) Filed: Jan. 28, 2016

(65) Prior Publication Data
US 2016/0286484 A1    Sep. 29, 2016

(30) Foreign Application Priority Data
Mar. 23, 2015    (JP) ................. 2015-059056

(51) Int. Cl.
*H04B 1/38*    (2015.01)
*H04W 52/02*    (2009.01)
*H04W 4/00*    (2018.01)

(52) U.S. Cl.
CPC ....... *H04W 52/0209* (2013.01); *H04W 4/008* (2013.01)

(58) Field of Classification Search
CPC .......................... H04W 52/0209; H04W 4/008

USPC ......................................................... 455/574
See application file for complete search history.

(56) References Cited

U.S. PATENT DOCUMENTS 9,247,495 B2 *    1/2016    Liu ................. H04W 52/0206
2016/0227350 A1 *    8/2016    Zhang ................. H04L 61/6022

FOREIGN PATENT DOCUMENTS

| JP | 2003-101439 A | 4/2003 |
| JP | 2004-205578 A | 7/2004 |
| WO | 2011/129086 A1 | 10/2011 |

OTHER PUBLICATIONS

Notification of Reasons for Refusal dated May 23, 2017 received in Japanese Patent Application No. JP 2015-059056 together with an English language translation.

* cited by examiner

*Primary Examiner* — Sanh Phu
(74) *Attorney, Agent, or Firm* — Scully, Scott, Murphy & Presser, P.C.

(57) ABSTRACT

A central transmits, to a peripheral connected with the central, re-connection information indicating a timing of a re-connection after a disconnection. Subsequently, the central executes a connection discontinuing process based on the re-connection information. In addition, the central controls power supply for wireless communication at a timing determined based on the re-connection information. Thereafter, the central executes a re-connection process with the peripheral based on the re-connection information shared therewith prior to the disconnection.

6 Claims, 6 Drawing Sheets

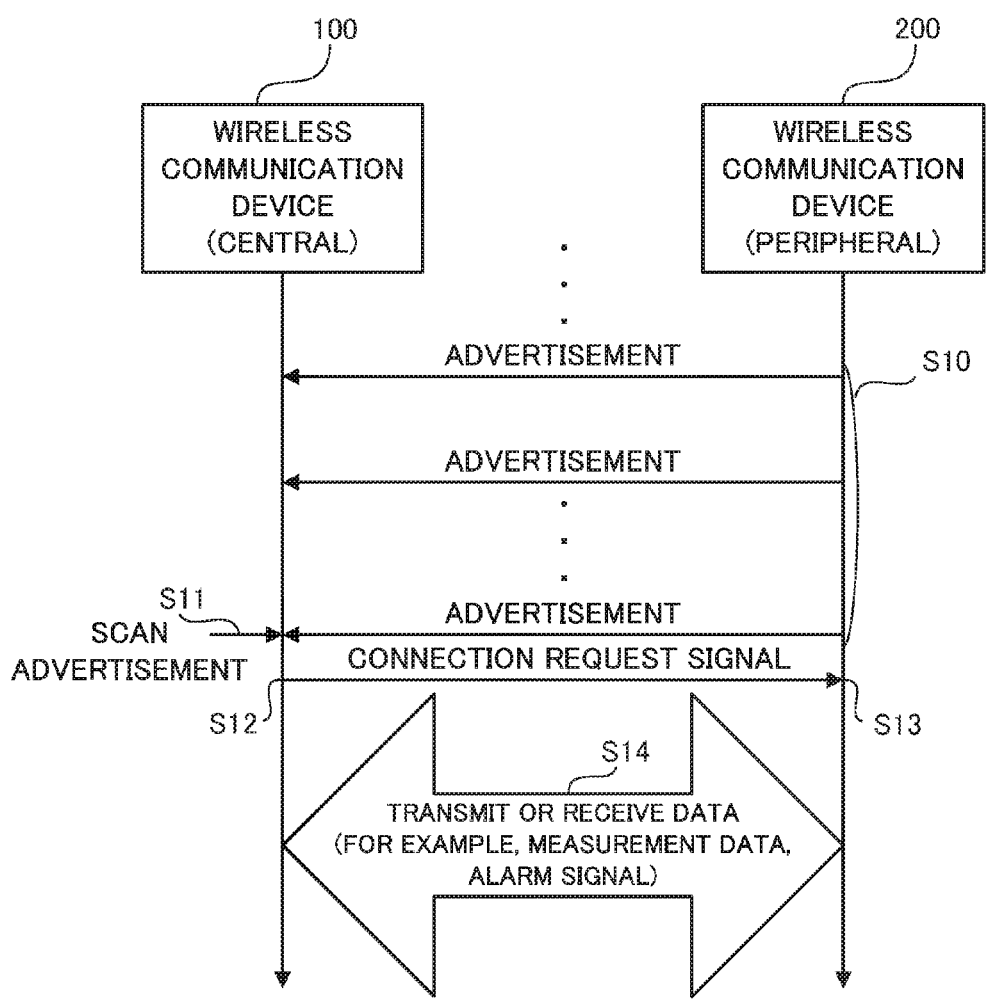

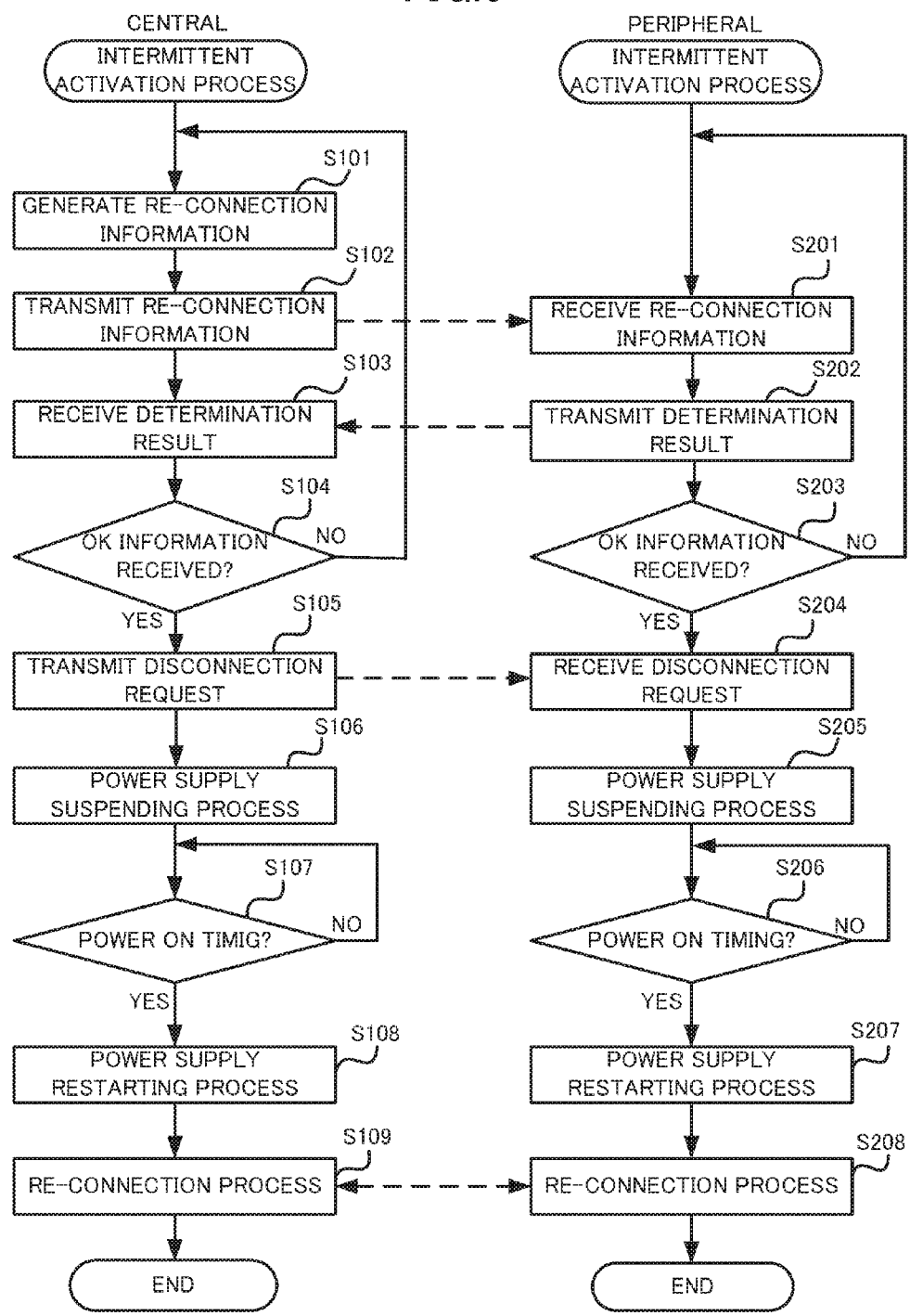

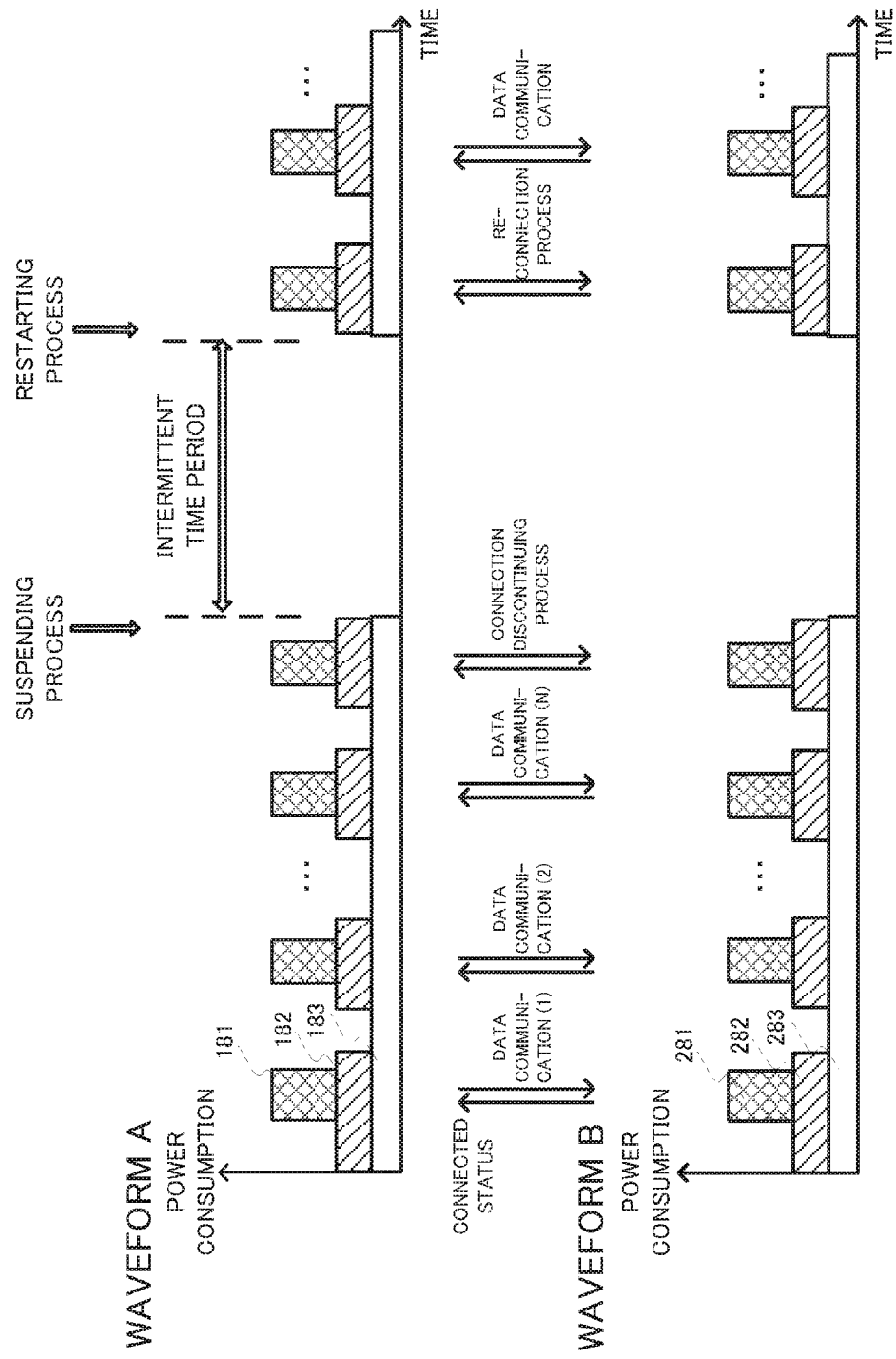

WIRELESS COMMUNICATION DEVICE, ELECTRONIC WATCH, WIRELESS COMMUNICATION METHOD, NON-TRANSITORY RECORDING MEDIUM, AND WIRELESS COMMUNICATION SYSTEM

CROSS-REFERENCE TO RELATED APPLICATION

This application claims the benefit of Japanese Patent Application No. 2015-059056, filed on Mar. 23, 2015, the entire disclosure of which is incorporated by reference herein.

FIELD

This application relates generally to a wireless communication device, an electronic watch, a wireless communication method, a non-transitory recording medium, and a wireless communication system.

BACKGROUND

In recent years, popularization of Bluetooth (registered trademark) low energy (hereinafter, referred to as a BLT) that is a short-range wireless communication standard which suppresses a power consumption is advancing. A wireless communication device that performs wireless communication based on this BLE performs any transmitting or receiving operation at a constant cycle even if there is no data to be transmitted or received in order to maintain a connection (link) with another wireless communication device that is a communication partner.

In order to reduce power consumption by such a transmitting or receiving operation, a wireless communication device has been proposed which changes the operation status (operation mode) in accordance with the presence or absence of data to be transmitted or received. For example, Unexamined Japanese Patent Application Kokai Publication No. 2004-205578 that is an example JP Patent Literature discloses a wireless communication device which changes the mode from a data communication mode for performing normal data communication to a power saving mode for transmitting or receiving a necessary signal to maintain the link when there is no data to be transmitted or received, and which discontinues the connection (cancels the maintained link), thereby becoming an operation suspended status when that power saving mode has continued for a predetermined time period.

The above wireless communication device becomes the power saving mode when there is no data to be transmitted or received. However, the transmitting or receiving operation of the signal necessary to maintain the link is continuously performed at a constant cycle. Hence, power consumption originating from such a transmitting or receiving operation is still necessary.

In addition, when the power saving mode has continued for the predetermined time period, the connection is discontinued and the device becomes the operation suspended status, and thus a return operation and a re-connection operation are necessary. According to Unexamined Japanese Patent Application Kokai Publication No. 2004-205578 that is an example JP Patent Literature, however, a specific procedure of performing the return operation and the re-connection operation from the operation suspended status is not disclosed.

Therefore, when the wireless communication device discontinues the connection and becomes the operation suspended status, and when data to be transmitted or received is generated under such a circumstance, the re-connection with another wireless communication device has not completed in some cases at this timing. In this case, although there is data to be transmitted or received, data communication for such data is not enabled until the re-connection completes.

SUMMARY

Accordingly, an objective of the present disclosure is to provide a wireless communication device, and the like that becomes a connected status with another wireless communication device at a timing at which data to be transmitted or received is generated while suppressing a power consumption.

In order to accomplish the above objective, a wireless communication device according to an aspect of the present disclosure includes:

a communicator configured to communicate with an other wireless communication device; and a processor configured to execute, based on re-connection information shared with, before disconnection, the other communication device connected with the local wireless communication device, and indicating a timing at which a re-connection after the disconnection is to be executed, a re-connection process with the other wireless communication device, and to control power supply for wireless communication at a timing determined based on the re-connection information.

BRIEF DESCRIPTION OF THE DRAWINGS

A more complete understanding of this application can be obtained when the following detailed description is considered in conjunction with the following drawings, in which:

FIG. 4 is a diagram illustrating a sequence of a wireless communication based on the BLE standard;

FIG. 5 is a diagram illustrating an example flowchart for an intermittent activation process; and FIG. 6 is a diagram illustrating an example operation in the intermittent activation process and example power consumption by each wireless communicator, and a waveform A is a waveform for the central, while a waveform B is a waveform for the peripheral.

DETAILED DESCRIPTION

Embodiment

Figure 1:
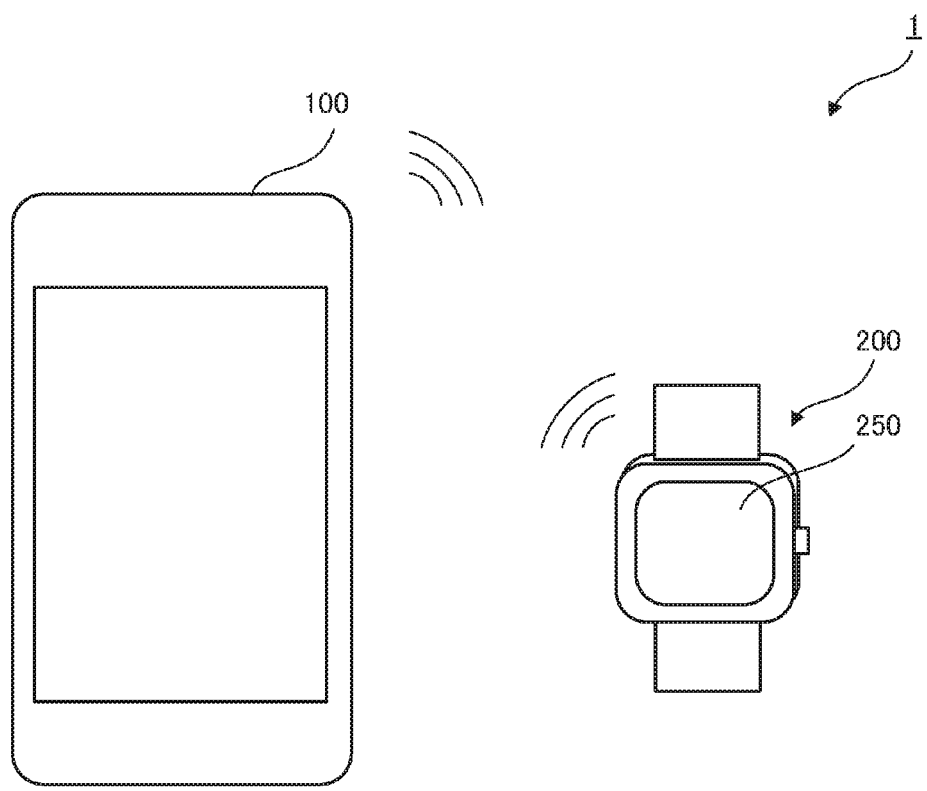
FIG. 1 is a diagram illustrating an example structure of a wireless communication system according to an embodiment of the present disclosure.

An explanation will be given of an embodiment of the present disclosure with reference to the accompanying figures. As illustrated in FIG. 1, a wireless communication system 1 according to an embodiment of the present disclosure includes a central 100 that is a wireless communication device, and a peripheral 200 that is another wireless communication device different from the central 100.

The central 100 and the peripheral 200 perform wireless communication with each other based on the Bluetooth (registered trademark) low energy (hereinafter, referred to as BLT). The BLE is a standard (mode) developed for the purpose of low power consumption in a short-range wireless communication standard called Bluetooth (registered trademark).

The central 100 and the peripheral 200 are each, for example, a portable terminal that has a wireless communication function based on the BLE, such as a mobile phone, a smartphone, a table personal computer, a laptop computer, or a watch.

In this embodiment, as an example, the central 100 is a smartphone, while the peripheral 200 is a highly functional watch which receives various data from the central 100, and which displays information on a display 250.

Figure 2:
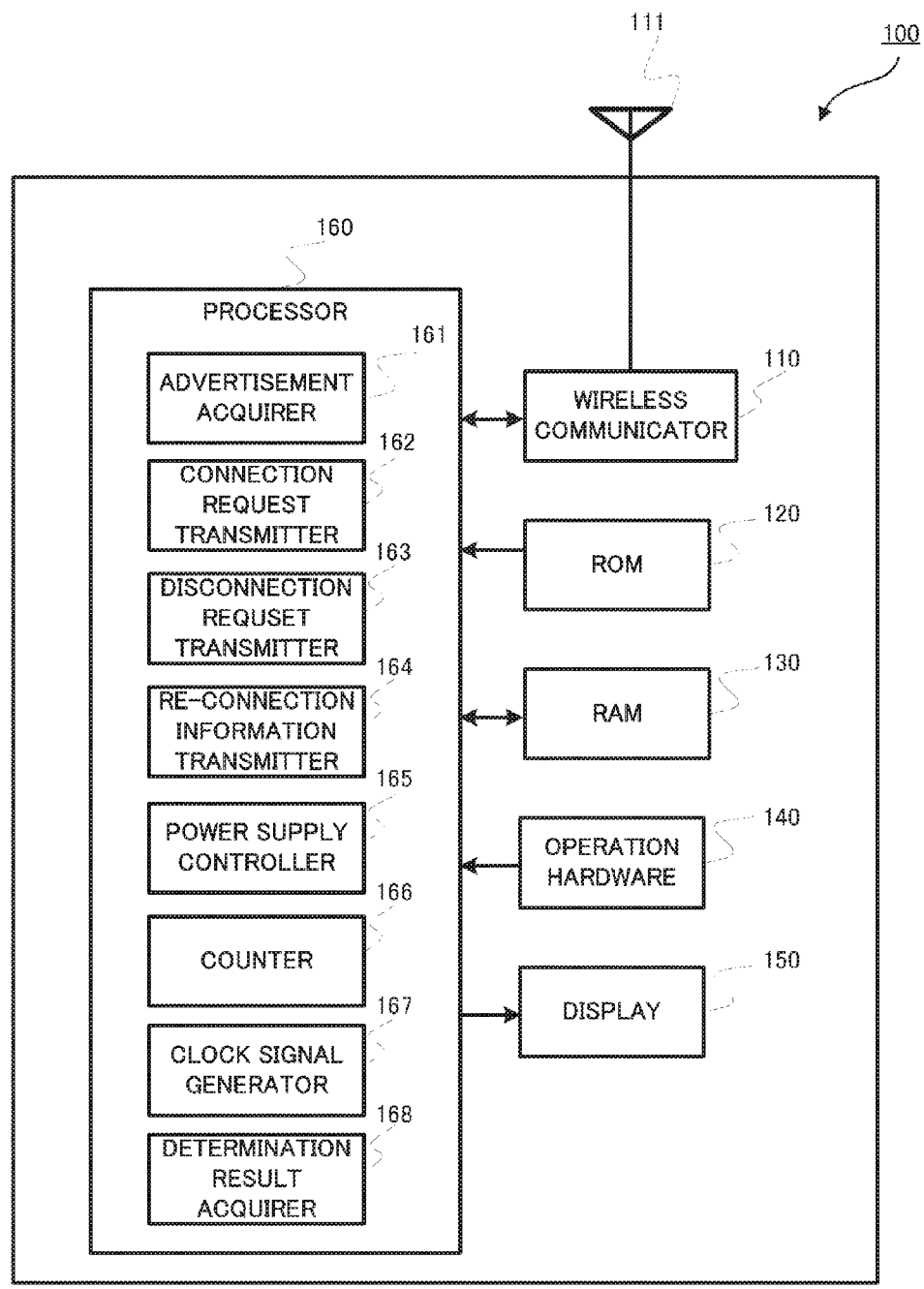
FIG. 2 is a block diagram illustrating an example structure of a central according to the embodiment.

An explanation will be given below of a structure of the central 100 according to this embodiment. As illustrated in FIG. 2, the central 100 includes a wireless communicator 110, a Read Only Memory (ROM) 120, a Random Access Memory (RAM) 130, operation hardware 140, a display 150, and a processor 160.

The wireless communicator 110 includes, for example, a wireless frequency (Radio Frequency, RF) circuit, a Base Band (BB) circuit, or an integrated circuit (e.g., a Large Scale Integration, LSI). In more precise sense, the wireless communicator 100 also includes an unillustrated clock signal generator for RF. The wireless communicator 110 transmits or receives signals via an antenna 111, and performs a wireless communication with the peripheral 200 that is another wireless communication device based on the BLE.

The ROM 120 includes a non-volatile memory like a flash memory, and stores programs and data for the processor 160 to control various functions.

The RAM 130 includes a volatile memory, and is utilized as a work area that temporarily stores data to enable the processor 160 to execute various processes.

The operation hardware 140 includes a touch panel, and is an interface utilized for a user to input an instruction.

The display 150 includes, for example, a Liquid Crystal Display (LCD) or an Electro Luminescence (EL) display, and displays an image in accordance with image data input from the processor 160.

The processor 160 includes, for example, a Central Processing Unit (CPU). The processor 160 executes various programs (for example, a program for an intermittent activation process to be explained later) stored in the ROM 120, thereby controlling the entire operations of the central 100.

Next, a functional structure of the processor 160 in the central 100 will be explained. As illustrated in FIG. 2, the processor 160 functions as an advertisement acquirer 161, a connection request transmitter 162, a disconnection request transmitter 163, a re-connection information transmitter 164, a power supply controller 165, a counter 166, a clock signal generator 167, and a determination result acquirer 168. Those advertisement acquirer 161, connection request transmitter 162, disconnection request transmitter 163, re-connection information transmitter 164, power supply controller 165, counter 166, clock signal generator 167, and determination result acquirer 168 may be realized by a single processor, or a processor may be provided for each functional block, and operate individually.

The advertisement acquirer 160 acquires, via the wireless communicator 110, announcement information (hereinafter, referred to as "advertisement") transmitted from the peripheral 200 based on a scanning instruction. An example user operation for the scanning instruction is a boot-up of an application to utilize a service by the central 100. In addition, the scanning instruction may be automatically given after a predetermined time has elapsed from the boot-up of the application regardless of the user operation.

The connection request transmitter 162 transmits, via the wireless communicator 110, a connection request that requests a connection with the peripheral 200. The connection request is transmitted when an establishment of a connection is necessary after the advertisement that has transmitted from the peripheral 200 is received. An example case in which an establishment of a connection is necessary is a case in which there is data to be transmitted or received by data communication.

The connection request is also transmitted when a re-connection is executed at a timing indicated by re-connection information from a status in which the connection is once discontinued. Hence, the advertisement receiver 161 and the connection request transmitter 162 correspond to a re-connection processor.

The connection request transmitter 163 transmits, via the wireless communicator 110, a disconnection request to discontinue the connection with the peripheral 200. The disconnection request is transmitted when, for example, a connection with the peripheral 200 is established to execute data communication, and there becomes no data to be transmitted or received. The disconnection request may be transmitted upon a disconnection instruction given by the user. The disconnection request transmitter 163 corresponds to a disconnection processor.

The re-connection information transmitter 164 transmits, via the wireless communicator 110, the re-connection information indicating a timing at which a re-connection is executed after the connection with the peripheral 200 is once discontinued. The re-connection information transmitter 164 corresponds to a re-connection information transmitting controller.

Note that a timing indicated by the re-connection information at which a re-connection is executed is computed based on a time at which data communication with the peripheral 200 is unnecessary. The time at which data communication is unnecessary is, for example, a transmission interval of the central 100 that transmits various data to the peripheral 200. This transmission interval may be constant or may be changeable so as to be short when a change in various data from the central 100 is large and to be long when such a change is little or there is no such a change.

The power supply controller 165 includes a switching circuit, and the like, and controls power supply for wireless communication. In addition, the power supply controller 165 performs a control, such as power supply suspension, restart, and increase or decrease for wireless communication at a timing determined based on the re-connection information. The power supply controller 165 corresponds to a power supply control processor.

The counter 166 includes a counter circuit that counts the number of pulses in a clock signal of the local device (central 100). The processor 160 executes various controls at a timing based on the number of pulses counted by the counter 166. The counter 166 corresponds to a time counting processor.

The clock signal generator 167 includes, for example, a crystal oscillator that generates a reference clock, and a variable PLL that generates a clock signal with a desired frequency based on the reference clock, and generates a clock signal for the local device (central 100). The frequency of the clock signal is controlled by changing the frequency dividing ratio of the variable PLL. The above re-connection information transmitter 164 converts a time after the re-connection information is transmitted via the wireless communicator 110 and until a timing at which the re-connection is executed into the number of pulses in the clock signal generated by the clock signal generator 167, and generates the re-connection information that is the number of pulses.

The determination result acquirer 168 acquires, via the wireless communicator 110, OK information or NG (No Good) information from the peripheral 200 that has received the re-connection information. The OK information indicates a determination result that the peripheral 200 is capable of executing the re-connection process at the timing indicated by the re-connection information, while the NG information indicates a determination result that the peripheral 200 is unable to execute the re-connection process.

Figure 3:
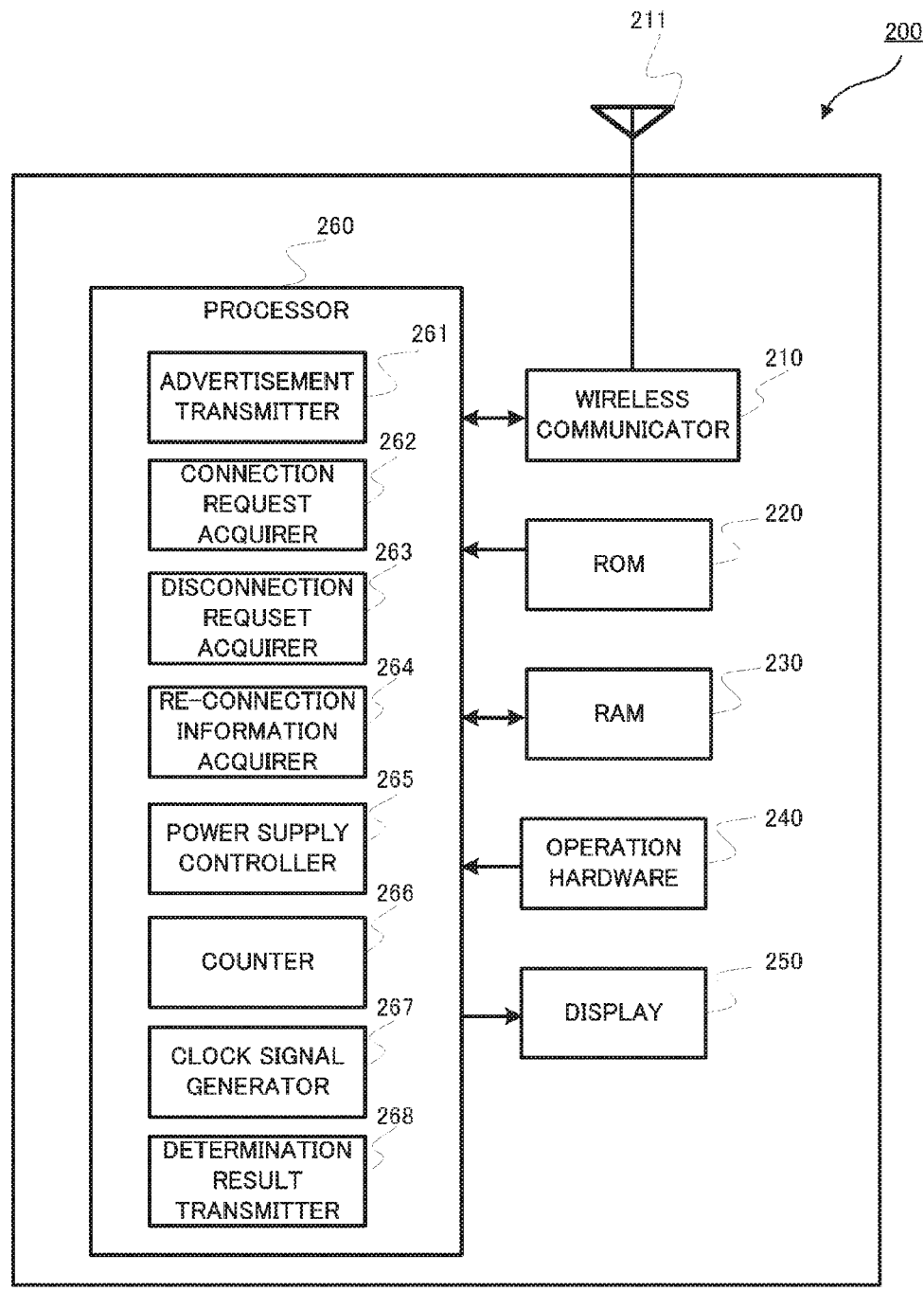
FIG. 3 is a block diagram illustrating an example structure of a peripheral according to the embodiment.

Next, an explanation will be given of a structure of the peripheral 200 according to this embodiment. As illustrated in FIG. 3, the peripheral 200 includes a wireless communicator 210, a ROM 220, a RAM 230, operation hardware 240, the display 250, and a processor 260.

The wireless communicator 210 includes, for example, an RF circuit, a BB circuit, or an LSI. The wireless communicator 210 performs a wireless communication with the central 100 that is another wireless communication device based on the BLE via an antenna 211.

The ROM 220 includes a non-volatile memory like a flash memory, and stores programs and data for the processor 260 to control various functions.

The RAM 230 includes a volatile memory, and is utilized as a work area that temporarily stores data to enable the processor 260 to execute various processes.

The operation hardware 240 includes, for example, switches, and is an interface that accepts an operation given by the user.

The display 250 includes, for example, an LCD or an EL display, and displays an image in accordance with image data input from the processor 260.

The processor 260 includes, for example, a CPU. The processor 260 executes various programs (for example, a program for the intermittent activation process to be explained later) stored in the ROM 220, thereby controlling the entire operations of the peripheral 200.

Next, a functional structure of the processor 260 in the peripheral 200 will be explained. As illustrated in FIG. 3, the processor 260 functions as an advertisement transmitter 261, a connection request acquirer 262, a disconnection request acquirer 263, a re-connection information acquirer 264, a power supply controller 265, a counter 266, a clock signal generator 267, and a determination result transmitter 268. Those advertisement transmitter 261, connection request acquirer 262, disconnection request acquirer 263, re-connection information acquirer 264, power supply controller 265, counter 266, clock signal generator 267, and determination result transmitter 268 may be realized by a single processor, or a processor may be provided for each functional block and operate individually.

The advertisement transmitter 261 transmits, via the wireless communicator 210, the advertisement at a predetermined timing. The predetermined timing may be a constant-cycle timing, or may be a timing indicated by the re-connection information acquired from the central 100.

The connection request acquirer 262 acquires, via the wireless communicator 210, the connection request from the central 100, and establishes a connection with the central 100. The establishment of the connection enables a data communication between the central 100 and the peripheral 200.

The connection request is transmitted by the central 100 that has received the advertisement from the advertisement transmitter 260. In addition, when the re-connection is executed at the timing indicated by the re-connection information from the status in which the connection is once discontinued, the connection request acquirer 262 also acquires the connection request via the wireless communicator 210. Hence, the advertisement transmitter 261 and the connection request acquirer 262 correspond to a re-connection processor.

The disconnection request acquirer 263 acquires, via the wireless communicator 210, a disconnection request to discontinues the connection with the central 100, thereby discontinuing the connection with the central 100. The disconnection request acquirer 263 corresponds to a disconnection processor.

The re-connection information acquirer 264 acquires, via the wireless communicator 210, the re-connection information indicating the timing at which the re-connection is executed after the connection with the central 100 is once discontinued. The re-connection information acquirer 264 corresponds to a re-connection information acquiring processor. Note that the advertisement transmitter 261 transmits, to the central 100 via the wireless communicator 210, the advertisement at the timing indicated by the re-connection information acquired by the re-connection information acquirer 264.

The power supply controller 265 includes a switching circuit, and the like, and controls power supply for wireless communication. In addition, the power supply controller 265 performs a control, such as power supply suspension, restart, and increase or decrease for wireless communication at a timing determined based on the re-connection information. The power supply controller 265 corresponds to a power supply control processor.

The counter 266 includes a counter circuit that counts the number of pulses in a clock signal of the local device (peripheral 200). The processor 260 executes various controls at a timing based on the number of pulses counted by the counter 266. The counter 266 corresponds to a time counting processor.

The clock signal generator 267 includes, for example, a crystal oscillator that generates a reference clock, and a variable PLL that generates a clock signal with a desired frequency based on the reference clock, and generates a clock signal for the local device (peripheral 200). The frequency of the clock signal is controlled by changing the frequency dividing ratio of the variable PLL. The above advertisement transmitter 261 transmits the advertisement via the wireless communicator 210 at a timing based on the number of pulses indicated by the re-connection information acquired by the re-connection information acquirer 264 and the number of pulses counted by the counter 266.

The determination result transmitter 268 determines whether or not the peripheral 200 is capable of executing the re-connection process at the timing indicated by the re-connection information, and when determining that the peripheral 200 is capable of executing such a process at that timing, transmits the OK information, and when determining that the peripheral 200 is not capable of executing such a process at that timing, transmits the NG information via the wireless communicator 210. Note that a case in which the peripheral 200 is not capable means a case in which, for example, the timing indicated by the re-connection information is too fast (intermittent time is too short), and thus the peripheral 200 is unable to follow, or the timing indicated by the re-connection information is too slow (intermittent time is too long), a displacement of the clock signal during the intermittent time is too large, and thus a transmitting or receiving timing is un-synchronizable.

A wireless communication based on the BLE standard will be explained with reference to FIG. 4. First, the peripheral 200 transmits the advertisement at the predetermined timing explained above (step S10). This advertisement is announcement information to inform the presence of the local device.

Next, the central 100 scans the channel with a frequency band at which the advertisement is transmitted, thereby receiving the advertisement (step S11). The central 100 transmits the connection request after a predetermined time (for example, 150 μsec) has elapsed from the timing at which the advertisement has been received (step S12).

Next, the peripheral 200 establishes a connection with the central 100 upon receiving the connection request (step S13), thereby transmitting or receiving data desired by the central 100 (step S14). Note that when there becomes no data to be transmitted or received, the connection discontinuing process is executed, and thus the wireless communication ends.

Next, an explanation will be given of the intermittent activation process to suppress power consumption by the central 100 and also power consumption by the peripheral 200 with reference to FIGS. 5 and 6. FIGS. 5 and 6 each show a repeatedly executed cycle of the intermittent activation process that is connected status→disconnection→re-connection→connected status.

FIG. 6 shows a transition in power consumption by the wireless communicator 110 of the central 100, a transition in power consumption by the wireless communicator 210 of the peripheral 200, and an operation timing through the intermittent activation process. In the waveforms A and B of FIG. 6, the vertical axis represents an amount of power consumption, while the horizontal axis represents a time.

Shown in the waveform A of FIG. 6 are a power consumption 181 inherent to the transmitting or receiving operation (for example, data transmission) of the wireless communicator 110 in the central 100, a power consumption 182 by the LSI in the wireless communicator 110, and a power consumption 183 by the other circuit, and the like in the wireless communicator 110.

In addition, shown in the waveform B of FIG. 6 are a power consumption 281 inherent to the transmitting or receiving operation (for example, data transmission) of the wireless communicator 210 in the peripheral 200, a power consumption 282 by the LSI in the wireless communicator 210, and a power consumption 283 by the other circuit, and the like in the wireless communicator 210.

In the normal connected status at the left side in FIG. 6, data communication between the central 100 and the peripheral 200 is executed and repeated once, twice, and the like. In this case, when there is no data to be transmitted or received at the N-th data communication (N), the intermittent activation process shown in FIG. 5 starts.

First of all, the re-connection information transmitter 164 of the central 100 generates the re-connection information by computing the timing at which the re-connection is to be executed (step S101). In addition, the re-connection information transmitter 164 of the central 100 causes the wireless communicator 110 to transmit the generated re-connection information to the peripheral 200 (step S102).

The re-connection information acquirer 264 of the peripheral 200 receives the re-connection information from the central 100 (step S201). Subsequently, the determination result transmitter 268 of the peripheral 200 determines whether or not the peripheral 200 is capable of executing the re-connection process at the timing indicated by the re-connection information, and transmits the determination result (that is, OK information or NG information) to the central 100 (step S202).

In this case, when the determination result transmitter 268 of the peripheral 200 has transmitted the NG information (step S203: NO), the peripheral 200 returns the process to the step S201, and becomes a status of receiving the re-connection information again. When the determination result transmitter 268 of the peripheral 200 has transmitted the OK information (step S203: YES), the peripheral 200 becomes a status of receiving the disconnection request.

Conversely, the determination result acquirer 168 of the central 100 acquires the determination result (OK information or NG information) transmitted from the peripheral 200 (step S103).

In this case, when the determination result acquirer 168 of the central 100 has acquired the NG information (step S104: NO), the central 100 returns the process to the step S101, and starts over the process from the generation of the re-connection information. When the determination result acquirer 168 of the central 100 has received the OK information (step S104: YES), the disconnection request transmitter 163 transmits the disconnection request to the peripheral 200 (step S105).

The disconnection request receiver 263 of the peripheral 200 receives the disconnection request (step S204), and discontinues the connection with the central 100. Hence, the connection discontinuing process wholly completes. Note that in the present specification, the term simply "connection discontinuing process" means either transmitting or receiving operation of the connection request.

Next, the power supply controller 165 of the central 100 and the power supply controller 265 of the peripheral 200 execute respective power supply suspending processes to suspend power supply for wireless communication (steps S106 and S205).

That is, after the completion of the connection discontinuing process (power OFF control timing), the power supply controller 165 of the central 100 turns OFF the LSI of the wireless communicator 110. Hence, the power consumption 182 by the LSI of the wireless communicator 110 becomes zero. Next, the power supply controller 165 of the central 100 turns OFF the wireless communicator 110. Hence, the power consumption 183 by the other circuits, and the like of the wireless communicator 110 becomes also zero. Consequently, as is indicated in FIG. 6 as a bidirectional arrow, after the power supply suspending process, an intermittent time period starts at which the power consumption by the wireless communicator 110 becomes zero.

The power supply controller 265 of the peripheral 200 likewise executes the power supply suspending process, and thus the power consumption 282 by the LSI of the wireless communicator 210 and the power consumption 283 by the other circuits, and the like of the wireless communicator 210 become zero. Consequently, as is indicated in FIG. 6 as the bidirectional arrow, after the power supply suspending process, an intermittent time period starts at which the power consumption by the wireless communicator 210 becomes zero.

Subsequently, the power supply controller 165 of the central 100 and the power supply controller 265 of the peripheral 200 stand by (step S107: NO and step S206: NO) until a timing at which the power supply restarting process is executed (power ON control timing) comes. Note that the timing at which the power supply restarting process is executed is a timing at which the number of pulses of the clock signal counted by each counter 166, 266 of each local device becomes the number of pulses right before the re-connection timing.

When, for example, the number of pulses counted by the counter when the re-connection information is transmitted or received is three, and the number of pulses that is a time indicated by the re-connection information is 20, since the timing at which the re-connection is executed is a time at which the number of pulses counted by the counter becomes 23, the timing of the power supply restarting process is set to be a time when the number of pulses counted by the counter becomes 21 or 22 right before the timing of the power supply restarting process.

When the power ON control timing comes (step S107: YES, step S206: YES), the power supply controller 165 of the central 100 and the power supply controller 265 of the peripheral 200 execute the respective power supply restarting processes (steps S108 and S207).

More specifically, the power supply controller 165 of the central 100 turns ON the wireless communicator 110, thereby turning ON the LSI thereof. In addition, the power supply controller 265 of the peripheral 200 turns ON the wireless communicator 210, thereby turning ON the LSI thereof. Hence, as is indicated by the bidirectional arrow in FIG. 6, the intermittent time period ends.

The central 100 and the peripheral 200 which have ended the power supply restarting process execute a re-connection process that establishes the discontinued connection again (steps S109 and S208).

That is, the advertisement transmitter 261 of the peripheral 200 transmits the advertisement at the timing of the re-connection, and the advertisement receiver 161 of the central 100 receives this advertisement. The connection request transmitter 162 of the central 100 that has received the advertisement transmits the connection request, the connection request receiver 262 of the peripheral 200 receives this request, and thus the peripheral 200 establishes a connection.

Accordingly, the re-connection process wholly completes, the central 100 and the peripheral 200 become the connected status, and data communication is executed as illustrated at the right side in FIG. 6. Note that in the present specification, the term simply "re-connection process for connection" means transmitting or receiving operation of either the connection request or the advertisement.

As explained above, according to the wireless communication system 1 of this embodiment, before discontinuing the connection, the central 100 and the peripheral 200 share the re-connection information indicating the timing at which the re-connection after the discontinuation of the connection is to be executed. Next, after the connecting discontinuing process, the central 100 and the peripheral 200 execute the re-connection process based on the shared re-connection information. In addition, the central 100 and the peripheral 200 control respective power supplies for wireless communication at the timing (power ON control timing and power OFF control timing) determined based on the re-connection information.

In this case, while the connection is discontinued, a transmitting or receiving operation at a constant cycle to maintain the link becomes unnecessary. Therefore, the central 100 and the peripheral 200 are capable of suppressing a power consumption. In addition, the central 100 and the peripheral 200 are capable of becoming the connected status (re-connected status) with each other at a timing at which data to be transmitted or received is generated based on the shared re-connection information.

Still further, by the intermittent activation process of the central 100 and the peripheral 200, as illustrated in FIG. 6, the intermittent time period at which power for wireless communication becomes zero is caused. Consequently, power consumption during the time period at which data communication is unnecessary is suppressed. Yet still further, at the timing at which data to be transmitted or received is generated, the central 100 and the peripheral 200 have already completed the re-connection process, and thus the central 100 and the peripheral 200 are already in the connected status.

The explanation for the embodiment ends now, but the above embodiment is merely an example, and the specific structures of the peripheral 200 and those of the central 100, and, the details of the processes, and the like, are not limited to the above embodiment.

Modified Examples

In the above embodiment, the explanation has been given of an example case in which the wireless communication devices are the central 100 and the peripheral 200 that perform wireless communication with each other based on the BLE. However, the present disclosure is not limited to the wireless communication devices that perform wireless communication based on the BLE. For example, the present disclosure is applicable to wireless communication devices that perform wireless communication based on Wi-Fi (registered trademark), Bluetooth (registered trademark), Zigbee (registered trademark), or the like.

In the above embodiment, the central 100 transmits the re-connection information, and the peripheral 200 that has received such information transmits the determination result. However, the present disclosure is not limited to this example case, and the peripheral 200 may transmit the re-connection information, while the central 100 may transmit the determination result. In addition, as for the wireless communication devices according to the present disclosure, the distinguishing of the wireless communication devices between the central and the peripheral like the above embodiment is not always necessary, and the respective structural components of the processors of both the central and the peripheral are interchangeable with each other.

In the above embodiment, the time indicated by the re-connection information is converted into the number of pulses, but the present disclosure is not limited to this example case. For example, the time indicated by the re-connection information may be indicated by a unit of time like 10 seconds. In addition, the re-connection information may be information indicating not the time but a clock time (for example, 03:06:05) of the timing at which the re-connection is executed.

In addition, in the above embodiment, the peripheral 200 transmits the advertisement at the timing indicated by the re-connection information, but the present disclosure is not limited to this example case. For example, when the peripheral 200 transmits the advertisement at the constant cycle, the time indicated by the re-connection information may be converted into the number of transmissions of the advertisement, and the central 100 may transmit the connection request and execute the re-connection process when receiving the advertisements by what corresponds to the number of transmissions.

In the above embodiment, the central 100 and the peripheral 200 recognize the timings of various controls, such as the re-connection process and the power supply control process, in view of the counted value of the number of pulses by the counters 166 and 266. However, the timings of various controls, such as the re-connection process and the power supply control process, may be recognized in view of not the counted value of the number of pulses by the counters 166 and 266, but the increase in counted value.

That is, for example, the timing at which the re-connection process is executed is not limited to the timing at which the counted value of the number of pulses by the counters 166 and 266 becomes the same value as the number of pulses indicated by the re-connection information. This is because resetting of the counted value of the number of pulses by the counters 166 and 266 as needed is optional.

In the above embodiment, the explanation has been given of an example case in which there are one central 100 and one peripheral 200, but there may be multiple peripherals 200. In this case, the central 100 recognizes each peripheral 200 that is the transmitter originator of the advertisement based on, for example, address information contained in the advertisement transmitted by such a peripheral 200.

The central 100 and the peripheral 200 according to the present disclosure are not limited to above devices, and computers that execute programs may realize the functions of the central 100 and those of the peripheral 200, respectively. Programs to realize the functions of the central 100 and those of the peripheral 200, respectively, may be recorded in a non-transitory computer readable recording medium, such as a Universal Serial Bus (USB) memory, a Compact Disc-Read Only Memory (CD-ROM), a Digital Versatile Disc (DVD), or a Hard Disk Drive (HDD), and may be downloaded via a network.

The foregoing describes some example embodiment(s) for explanatory purposes. Although the foregoing discussion has presented specific embodiment(s), persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device comprising:
a communicator configured to communicate with an other wireless communication device; and
a processor configured to:
cause the communicator to acquire re-connection information transmitted from the other wireless communication device before disconnection is established between the wireless communication device and the other wireless communication device,
wherein the re-connection information indicates a timing at which a re-connection process between the wireless communication device and the other wireless communication device is to be executed after the disconnection;
determine whether the timing indicated by the re-connection information is a timing at which the wireless communication device can reconnect with the other wireless communication device or not;
execute a connection discontinuing process to establish the disconnection between the wireless communication device and the other wireless communication device depending on a result of the determination;
suspend power supply to a component of the wireless communication device which is necessary for wireless communication after the connection discontinuing process; and
restart the suspended power supply to the component of the wireless communication device prior to the timing indicated by the re-connection information.

2. The wireless communication device according to claim 1,
wherein the processor is configured to:
count a number of pulses of a clock signal for the wireless communication device,
wherein the re-connection information indicates a number of pulses of the clock signal converted from a time from the transmission of the re-connection information by the other wireless communication device to the timing at which the re-connection process is to be executed; and
execute the re-connection process based on the counted number of pulses and the number of pulses indicated by the re-connection information.

3. The wireless communication device according to claim 1,
wherein the re-connection information indicates a clock time of the timing at which the re-connection process is to be executed, and
wherein the processor is configured to execute the re-connection process based on the clock time indicated by the re-connection information.

4. A wireless communication system comprising:
a first wireless communication device comprising a first communicator and a first processor; and
a second wireless communication device comprising a second communicator and a second processor, wherein the first communicator and the second communicator are configured to perform wireless communication between the first wireless communication device and the second wireless communication device,
wherein the first processor is configured to cause the first communicator to transmit re-connection information to the second wireless communication device connected with the first wireless communication device before disconnection is established between the first wireless communication device and the second wireless communication device,
wherein the re-connection information indicates a timing at which a re-connection process between the first wireless communication device and the second wireless communication device is to be executed after the disconnection,
wherein the second processor is configured to:
cause the second communicator to acquire the re-connection information transmitted from the first wireless communication device before the disconnection is established between the first wireless communication device and the second wireless communication device,
determine whether the timing indicated by the re-connection information is a timing at which the second wireless communication device can reconnect with the first wireless communication device or not; and
cause the second communicator to transmit a result of the determination to the first wireless communication device, wherein the first processor is configured to:
  cause the first communicator to receive the result of the determination;
  execute the re-connection process with the second wireless communication device depending on the result of the determination; and
  control power supply to a component of the first wireless communication device which is necessary for wireless communication at a first timing determined based on the re-connection information, and
wherein the second processor is configured to:
  execute the re-connection process with the first wireless communication device depending on the result of the determination; and
  control power supply to a component of the second wireless communication device which is necessary for wireless communication at a second timing determined based on the re-connection information.

5. A wireless communication method comprising:
causing a wireless communication device to acquire re-connection information transmitted from an other wireless communication device before disconnection is established between the wireless communication device and the other wireless communication device,
  wherein the re-connection information indicates a timing at which a re-connection process between the wireless communication device and the other wireless communication device is to be executed after the disconnection;
determining whether the timing indicated by the re-connection information is a timing at which the wireless communication device can reconnect with the other wireless communication device or not;
executing a connection discontinuing process to establish the disconnection between the wireless communication device and the other wireless communication device depending on a result of the determination;
suspending power supply to a component of the wireless communication device which is necessary for wireless communication after the connection discontinuing process; and
restarting the suspended power supply to the component of the wireless communication device prior to the timing indicated by the re-connection information.

6. A non-transitory recording medium having stored therein a program that causes a computer to:
cause a communicator of a wireless communication device to acquire re-connection information transmitted from an other wireless communication device before disconnection is established between the wireless communication device and the other wireless communication device,
  wherein the re-connection information indicates a timing at which a re-connection process between the wireless communication device and the other wireless communication device is to be executed after the disconnection;
determine whether the timing indicated by the re-connection information is a timing at which the wireless communication device can reconnect with the other wireless communication device or not;
execute a connection discontinuing process to establish the disconnection between the wireless communication device and the other wireless communication device depending on a result of the determination;
suspend power supply to a component of the wireless communication device which is necessary for wireless communication after the connection discontinuing process; and
restart the suspended power supply to the component of the wireless communication device prior to the timing indicated by the re-connection information.

* * * * *